United States Patent
Kewitsch et al.

[11] Patent Number: 5,875,272
[45] Date of Patent: Feb. 23, 1999

[54] WAVELENGTH SELECTIVE OPTICAL DEVICES

[75] Inventors: Anthony S. Kewitsch, Hacienda Heights; George A. Rakuljic, Santa Monica; Amnon Yariv, San Marino, all of Calif.

[73] Assignee: Arroyo Optics, Inc., Santa Monica, Calif.

[21] Appl. No.: 738,068

[22] Filed: Oct. 25, 1996

Related U.S. Application Data

[63] Continuation-in-part of Ser. No. 703,357, Aug. 26, 1996, Pat. No. 5,805,751.

[60] Provisional application No. 60/005,915, Oct. 27, 1995.

[51] Int. Cl.[6] .................................................. G02B 6/34
[52] U.S. Cl. .................................................. 385/37; 385/24
[58] Field of Search .................................. 385/14–16, 24, 385/27, 28, 31, 37, 39, 48

[56] References Cited

U.S. PATENT DOCUMENTS

| | | | |
|---|---|---|---|
| 4,474,427 | 10/1984 | Hill et al. | 385/123 |
| 4,725,110 | 2/1988 | Glenn et al. | 359/3 |
| 4,737,007 | 4/1988 | Alferness et al. | 385/30 |
| 4,737,607 | 4/1988 | Bernard et al. | 218/23 |
| 4,807,950 | 2/1989 | Glenn et al. | 385/123 |
| 4,900,119 | 2/1990 | Hill et al. | 385/27 |
| 5,007,705 | 4/1991 | Morey et al. | 385/12 |
| 5,016,967 | 5/1991 | Meltz et al. | 385/37 |
| 5,104,209 | 4/1992 | Hill et al. | 385/27 |
| 5,107,360 | 4/1992 | Huber | 359/124 |
| 5,157,747 | 10/1992 | Atkins et al. | 385/37 |
| 5,187,760 | 2/1993 | Huber | 385/37 |
| 5,216,739 | 6/1993 | Hill et al. | 385/123 |
| 5,218,655 | 6/1993 | Mizrahi | 385/39 |
| 5,235,659 | 8/1993 | Atkins et al. | 385/124 |
| 5,271,024 | 12/1993 | Huber | 372/6 |
| 5,287,427 | 2/1994 | Atkins et al. | 385/124 |
| 5,309,260 | 5/1994 | Mizrahi et al. | 359/3 |
| 5,327,515 | 7/1994 | Anderson et al. | 385/123 |
| 5,337,382 | 8/1994 | Mizrahi | 385/37 |
| 5,351,321 | 9/1994 | Snitzer et al. | 385/10 |
| 5,363,239 | 11/1994 | Mizrahi et al. | 359/570 |
| 5,367,588 | 11/1994 | Hill et al. | 385/37 |
| 5,377,288 | 12/1994 | Kashyap et al. | 385/37 |

(List continued on next page.)

FOREIGN PATENT DOCUMENTS

WO 89/12243  12/1989  WIPO.
WO 95/14946  6/1995  WIPO.

OTHER PUBLICATIONS

"All–Fibre Narrowband Reflection Gratings at 1500 nm", Elect. Letters, vol. 26, No. 11, May 24, 1990, pp. 730–732, R. Kashyap et al.

C.M. Ragdale, et al., "Integrated Three Channel Laser and Optical Multiplexer for Narrowband Wavelength Division Multiplexing", Elect. Ltrs., vol. 30, No. 11, May 26, 1994, pp. 897–898.

P.E. Dyer, et al., "High Reflectivity Fibre Gratings Produced by Incubated Damage Using a 193 nm ArF Laser", Elect. Ltrs., Vo. 30, No. 11, May 26, 1994, pp. 860–862.

(List continued on next page.)

Primary Examiner—John D. Lee
Attorney, Agent, or Firm—Jones, Tullar & Cooper, PC

[57] ABSTRACT

Wavelength selective devices and subsystems having various applications in the field of optical communications are disclosed. These devices and subsystems are composed of bi-directional grating assisted mode couplers. The high add/drop efficiency and low loss of this coupler enable low loss wavelength selective elements such as optical switches, amplifiers, routers, and sources to be fabricated. The grating assisted mode coupler can be wavelength tuned by modifying the optical properties of the coupler interaction region. A programmable, wavelength selective router composed of multiple grating assisted mode couplers is also disclosed.

31 Claims, 10 Drawing Sheets

U.S. PATENT DOCUMENTS

| | | | |
|---|---|---|---|
| 5,400,166 | 3/1995 | Huber | 359/173 |
| 5,416,866 | 5/1995 | Sahlén | 385/37 |
| 5,420,948 | 5/1995 | Byron | 385/37 |
| 5,425,116 | 6/1995 | Dragone et al. | 385/24 |
| 5,444,803 | 8/1995 | Kim et al. | 385/28 |
| 5,450,511 | 9/1995 | Dragone | 385/37 |
| 5,457,758 | 10/1995 | Snitzer | 385/30 |
| 5,459,801 | 10/1995 | Snitzer | 385/30 |
| 5,495,548 | 2/1996 | Bilodeau et al. | 385/123 |
| 5,506,925 | 4/1996 | Greene et al. | 385/129 |
| 5,517,589 | 5/1996 | Takeuchi | 385/24 |
| 5,574,807 | 11/1996 | Snitzer | 385/24 |
| 5,581,642 | 12/1996 | Beacon et al. | 385/15 |

OTHER PUBLICATIONS

V. Mizrahi, et al., "Four Channel Fibre Grating Demultiplexer", Elect. Ltrs., vol. 30, No. 10, May 12, 1994, pp. 780–781.

B. Malo et al., "Point–by–Point Fabrication of Micro–Bragg Gratings in Photosensitive Fibre Using Single Excimer Pulse Refractive Index Modification Techniques", Elect. Ltrs., vol. 29, No. 18, Sep. 2, 1993, pp. 1668–1669.

François Ouellette, et al., "Enhancement of Second–Harmonic Generation in Optical Fibers by A Hydrogen and Heat Treatment", Appl. Phys. Lett. 54(12), Mar. 20, 1989, pp. 1086–1088.

P.J. Lemaire, et al., "High Pressure $H_2$ Loading as A Technique for Achieving Ultrahigh UV Photosensitivity and Thermal Sensitivity in $GeO_2$ Dodped Optical Fibers", IEE 1993, Apr. 23, 1993, pp. 1191–1193.

R.M. Atkins, et al., "Mechanisms of Enhanced UV Photosensitivity Via Hydrogen Loading in Germanosilicate Glasses", IEE 1993, May 11, 1993, 2 pp.

B. Malo, et al., "Effective Index Drift From Molecular Hydrogen Diffusion in Hydrogen–Loaded Optical Fibres and Its Effect on Bragg Grating Fabrication", Elect. Ltrs., vol. 30, No. 5, Mar. 3, 1994, pp. 442–443.

G.D. Maxwell, et al., "UV Written 13 dB Reflection Filters in Hydrogenated Low Loss Planar Silica Waveguides", No Journal Name/Date.

"Efficient Mode Conversion in Telecommunication Fibre Using Externally Written Gratings", Elect. Ltrs. vol. 26, No. 16, Aug. 1990, pp. 1270–1272.

O. Okamoto, et al., "16–Channel Optical Add/Drop Multiplexer Using Silica–Based Arrayed–Waveguide Gratings", IEE 1995, Mar. 1995, 2 pp.

Y. Tachikawa, et al., "32 Wavelength Tunable Arrayed–Waveguide Grating Laser Based on Special Input/Output Arrangement", Elect. Ltrs., vol. 31, No. 19, Sep. 1995, pp. 1665–1666.

L. Dong, et al., "Ultraviolet Absorption in Modified Chemical Vapor Deposition Preforms", J. Opt. Soc. Am. B/Vol. 11, No. 10, Oct. 1994, pp. 2106–2111.

D.L. Williams, et al., "Accelerated Lifetime Tests on UV Written IntraCore Gratings in Boron Germania Codoped Silica Fibre", Elect. Ltrs., vol. 31, No. 24, Nov. 1995, pp. 2120–2121.

M.S. Yataki, et al., "All–Fibre Wavelength Filters Using Concatenated Fused–Taper Couplers", Elect. Ltrs., vol. 21, No. 6, Mar. 1985, pp. 248–249.

M.C. Farries, et al., "Very Broad Reflection Bandwidth (44 nm) Chirped Fibre Gratings and Narrow Bandpass Filters Produced by the Use of an Amplitude Mask", Elect. Ltrs., vol. 30, No. 11, May 1994, pp. 891–892.

Victor Mizrahi, et al., "Optical Properties of Photosensitive Fiber Phase Gratings", J. of Lightwave Tech., vol. 11, No. 10, Oct. 93, pp. 1513–1517.

Jocelyn Lauzon, et al., "Numerical Analysis of the Optimal Length and Profile of a Linearly Chirped Fiber Bragg Grating for Dispersion Compensation", Optics Ltrs., vol. 20, No. 6, Mar. 1995, pp. 647–649.

François Ouellette, "All–Fiber Filter for Efficient Dispersion Compensation", Optics Ltrs., vol. 16, No. 5, Mar. 1991, pp. 303–305.

F. Ouelette, et al., "Broadband and WDM Dispersion Compensation Using Chirped Sampled Fibre Bragg Gratings", Elect. Ltrs., vol. 31, No. 11, May 1995, pp. 899–901.

Philip St. J. Russell, et al., "Fibre Gratings", Physics World, Oct. 1993, 6 pp.

D.L. Williams, et al., "Enhanced UV Photosensitivity in BoronCodoped Germanosilicate Fibres", Elect. Ltrs., vol. 29, No. 1, Jan. 1993, pp. 45–47.

R. Kashyap, et al., "Measurement of Ultra–Steep Edge, High Rejection Fibre Bragg Grating Filters", Elect. Ltrs., vol. 31, No. 15, pp. 1282–1283, Jul. 1995.

Vikram Bhatia et al, "Optical Fiber Long–Period Grating Sensors" Optics Ltrs., vol. 21, No. 9, May 1996, pp. 692–694.

Richard L. Laming, et al., "Fibre Bragg Gratings; Application to Lasers and Amplifiers", Optoelect. Res. Ctr, 31 pp. no date.

L. Dong, et al., "Single Pulse Bragg Gratings Written During Fibre Drawings", Elect. Ltrs., vol. 29, No. 17, Aug. 1993, pp. 1577–1578.

J.L. Archambaualt, et al., "High Reflectivity and Narrow Bandwidth Fibre Gratings Written by Single Excimer Pulse", 2 pp., *no Journal name/date.

F. Bilodeau, et al., "An All–Fiber Dense–Wavelength–Division Multiplexer/Demultiplexer Using Photoimprinted Bragg Gratings", IEEE Photo. Tech. Ltrs., vol. 7, No. 4, Apr. 1995, pp. 388–390.

F. Bilodeau, et al., "Photosensitization of Optical Fiber and Silica–on–Silicon/Silica Waveguides", Optics Ltrs., vol. 18, No. 12, Jun. 1993, pp. 953–955.

paul J. Lemaire, "Reliability of Optical Fibers Exposed to Hydrogen: Prediction of Long–Term Loss Increases", Optic. Eng., vol. 30, No. 6, Jun. 1991, pp. 780–789.

James F.f. Shackelford, et al., "Solubility of Gases in Glass. II. He, Ne, and $H_2$ in Fused Silica", J. Appl. Phys., vol. 43, No. 4, Apr. 1972, pp. 1619–1626.

L. Dong, et al., "Enhanced Photosensitivity in Tin–Codoped Germanosilicate Optical Fibers", IEEE Photo. Tech. Ltrs., vol. 7, No. 9, Sep. 1995, pp. 1048–1050.

K.O. Hill, et al., "Photosensitivity in Optical Fibers", Ann. Rev. Mater Sci. 1993, 125–157. (No month).

K.P. Jones, et al., "Optical Wavelength Add–Drop Multiplexer in Installed Submarine WDM Network", Elect. Ltrs., vol. 31, No. 24, Nov. 1995, pp. 2117–2118.

T.A. Birks, et al., "2×2 Single–Mode Fiber Routing Switch", Optics Ltrs., vol. 21, No. 10, May 1996, pp. 722–724.

T.A. Birks, et al., "Low Power Acousto–Optic Device Based on a Tapered Single–Mode Fiber", IEEE Photo. Tech. Ltrs., vol. 6, No. 6, Jun. 1994, pp. 725–727.

D.O. Culverhouse, et al., "Four Port Fused Taper Acousto–Optic Devices Using Standard Singlemode Telecommunications Fibre", Elect. Ltrs., vol. 31, No. 15, Jul. 1995, pp. 1279–1280.

T.A. Birks, et al., "Four–Port Fiber Frequency Shifter With a Null Taper Coupler", Optics Ltrs., vol. 19, No. 23, Dec. 1994, pp. 1964–1966.

T.A. Birks, et al., "All–Fiber Polarizer Based on a Null Taper Coupler", Optics Ltrs., vol. 20, No. 12, Jun. 1995, pp. 1371–1373.

H. Bissessur, et al., "16 Channel Phased Array Wavelength Demultiplexer on InP With Low Polarization Sensitivity", IEEE 1994, Dec. 1993, 2 pp.

M.S. Whalen, et al., "In–Line Optical–Fibre Filter For Wavelength Multiplexing", Elect. Ltrs., vol. 21, No. 17, Aug. 1985, pp. 724–725.

Y. Inoue, et al., "Silica–Based Arrayed–Waveguide Grating Circuit as Optical Splitter/Router", IEEE, Mar. 1995, 2 pp.

Hiroshi Yasaka, et al., "Multiwavelength Light Source With Precise Frequency Spacing Using Mode–Locked Semiconductor Laser and Arrayed Waveguide Grating Filter", OFC '96 Tech. Digest, pp. 299–300, 1996. (No Month).

Z.M. Chuang, et al., "Enhanced Wavelength Tuning in Grating–Assisted Codirectional Coupler Filter", IEEE Photo. Tech. Ltrs., vol. 5, No. 10, Oct. 1993, pp. 1219–1221.

FIG. 7(a)
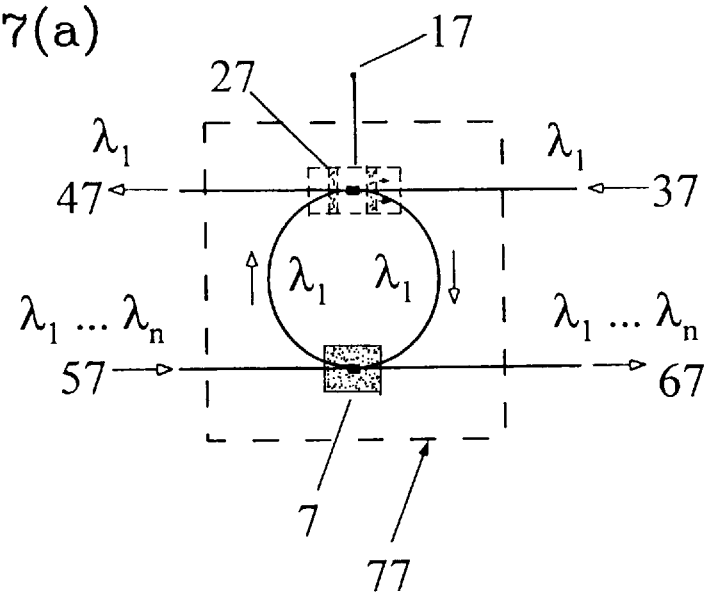
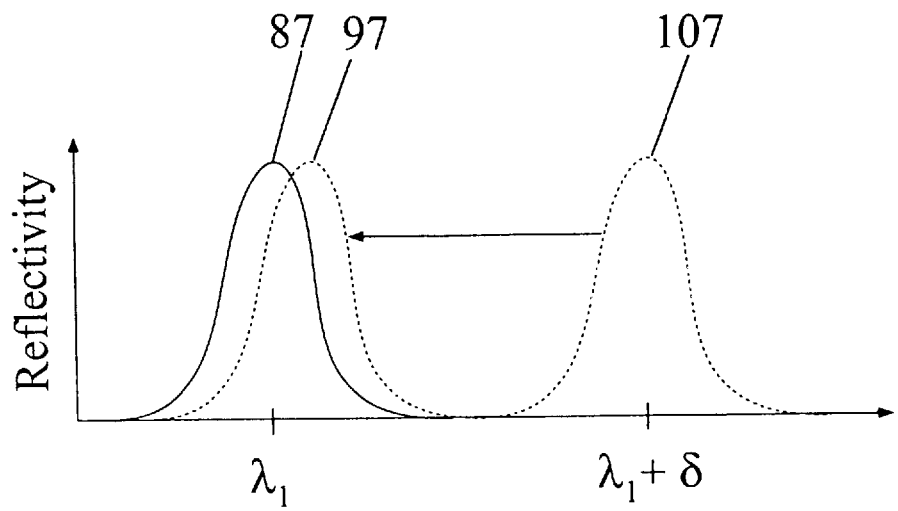
FIG. 7(b)

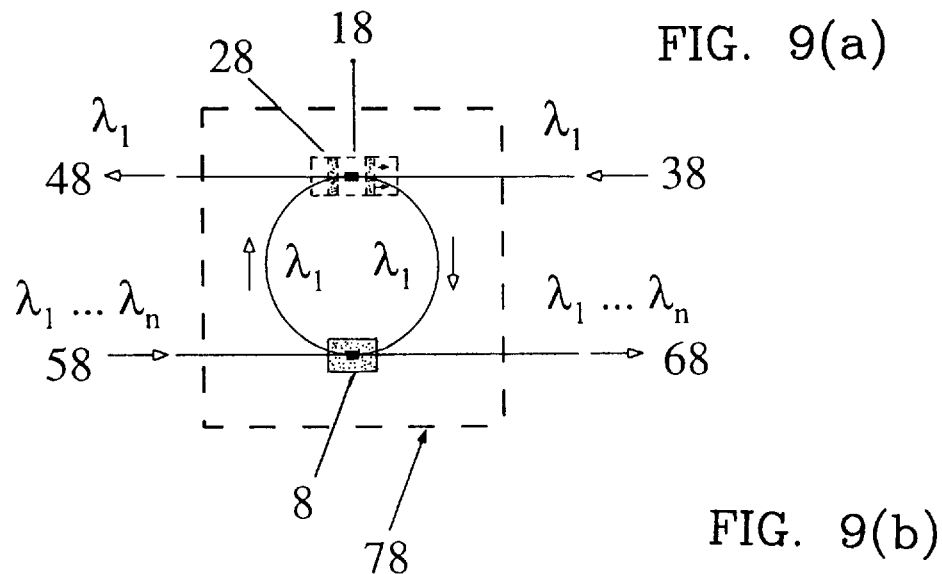
FIG. 9(a)
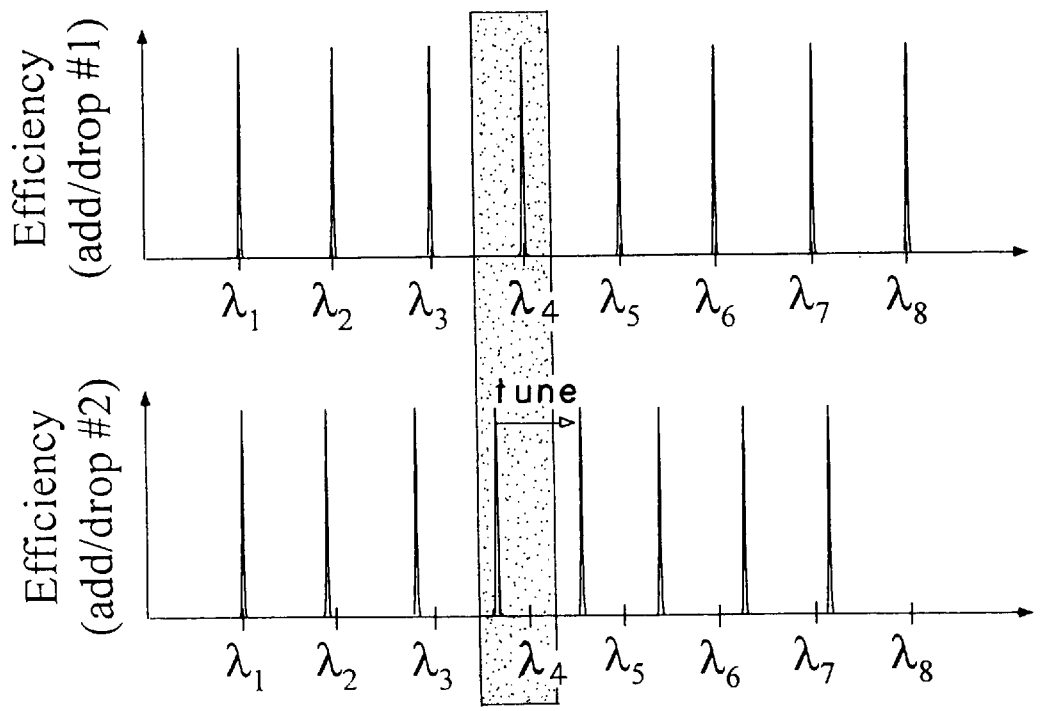
FIG. 9(b)
FIG. 9(c)

WAVELENGTH SELECTIVE OPTICAL DEVICES

REFERENCE TO RELATED APPLICATIONS

This application is a continuation-in-part of U.S. application Ser. No. 08/703,357, filed on Aug. 26, 1996, now U.S. Pat. No. 5,805,751, issued Sep. 8, 1998, and claims the benefit of Provisional Application No. 60/005,915, filed Oct. 27, 1995.

FIELD OF THE INVENTION

The present invention relates to the communication of signals via optical fibers, and particularly to an optical fiber coupler and methods for making the same. More particularly, the invention relates to optical devices and subsystems using a wavelength selective optical coupler.

DESCRIPTION OF RELATED ART

Low loss, wavelength selective couplers are important components for optical fiber communication networks based on wavelength division multiplexing (WDM). WDM enables an individual optical fiber to transmit several channels simultaneously, the channels being distinguished by their center wavelengths. An objective is to provide a precise wavelength selective coupler that is readily manufactured and possesses high efficiency and low loss. One technology to fabricate wavelength selective elements is based on recording an index of refraction grating in the core of an optical fiber. See, for instance, Hill et al., U.S. Pat. No. 4,474,427 (1984) and Glenn et al., U.S. Pat. No. 4,725,110 (1988). The currently preferred method of recording an in-line grating in optical fiber is to subject a photosensitive core to the interference pattern between two beams of actinic (typically UV) radiation passing through the photoinsensitive cladding.

Optical fiber gratings reported in the prior art almost universally operate in the reflection mode. To gain access to this reflected mode in a power efficient manner is difficult, because the wave is reflected backwards within the same fiber. A first method to access this reflected light is to insert a 3 dB coupler before the grating, which introduces a net 6 dB loss on the backwards reflected and outcoupled light. A second method is to insert an optical circulator before the grating to redirect the backwards propagating mode into another fiber. This circulator introduces an insertion loss of 1 dB or more and involves complicated bulk optic components. A method to combine the filtering function of a fiber grating with the splitting function of a coupler in a low loss and elegantly packaged manner would be highly desirable for WDM communication networks.

Another method well known in the prior art uses directional coupling to transfer energy from one waveguide to another by evanescent coupling (D. Marcuse, "Theory of Dielectric Waveguides," Academic Press 1991 and A. Yariv, "Optical Electronics," Saunders College Publishing, 1991). This evanescent coupling arises from the overlap of the exponential tails of the modes of two closely adjacent waveguides, and is the typical mode of operation for directional coupler based devices. In contrast, non-evanescent coupling occurs when the entire optical modes substantially overlap, as is the case when the two wave-guides are merged into a single waveguide. Devices that rely on evanescent coupling (e.g., directional couplers) in contrast to non-evanescent coupling have inherently weaker interaction strengths.

One realization of a directional coupling based device uses gratings recorded in a coupler composed of two identical polished fibers placed longitudinally adjacent to one another (J.-L. Archambault et al., Optics Letters, Vol. 19, p. 180 (1994)). Since the two waveguides are identical in the coupling region, both waveguides possess the same propagation constant and energy is transferred between them. This results in poor isolation of the optical signals traveling through the two waveguides, because optical power leaks from one fiber to the other. Another device also based on evanescent coupling was patented by E. Snitzer, U.S. Pat. No. 5,459,801 (Oct. 17, 1995). This device consists of two identical single mode fibers whose cores are brought close together by fusing and elongating the fibers. The length of the coupling region should be precisely equal to an even or odd multiple of the mode interaction length for the output light to emerge entirely in one of the two output ports. A precisely positioned Bragg grating is then UV recorded in the cores of the waist region.

An alternative grating assisted directional coupler design reported by R. Alferness et al., U.S. Pat. No. 4,737,007 and M. S. Whalen et al., Electronics Letters, Vol. 22, p. 681 (1986) uses locally dissimilar optical fibers. The resulting asymmetry of the two fibers improves the isolation of the optical signals within the two fibers. However, this device used a reflection grating etched in a thin surface layer on one of the polished fibers, dramatically reducing, the coupling strength of the grating. It also is based on evanescent coupling. A serious drawback of this device is that the wavelength for which light is backwards coupled into the adjacent fiber is very close to the wavelength for which light is backreflected within the original fiber (about 1 nm). This leads to undesirable pass-band characteristics that are ill suited for add/drop filter devices designed to add or drop only one wavelength. For optical communications applications in the Er doped fiber amplifier (EDFA) gain window (1520 to 1560 nm), this backreflection should occur at a wavelength outside this window to prevent undesirable crosstalk. The separation between the backreflected and backwards coupled wavelengths is impractically small for the all-fiber, grating assisted directional coupler approaches of the prior art.

Alternatively, F. Bilodeau et al., IEEE Photonics Technology Letters, Vol. 7, p. 388 (1995) fabricated a Mach-Zender interferometer which served as a wavelength selective coupler. This device relies on the precisely controlled phase difference between two interferometer arms and is highly sensitive to environmental fluctuations and manufacturing variations. In addition, a significant fraction of the input signal is back reflected. Therefore, it is uncertain whether this device will be able to meet the demanding reliability requirements for telecommunications components.

The conventional grating assisted directional coupler suffers from both a relatively low coupling strength and small wavelength separation of back-reflected and backwards coupled light. These problems arise because the two coupled optical waveguides remain physically separate and the light remains guided primarily in the original cores. Only the evanescent tails of the modes in each of the two waveguides overlap, corresponding to evanescent coupling.

Two locally dissimilar optical fibers can instead be fused and elongated locally to form a single merged waveguide core of much smaller diameter, forming a mode coupler. The resulting optical mode propagation characteristics are effectively those of a multimode silica core/air cladding waveguide. The two waveguides are merged such that the energy in the original optical modes of the separate waveguides interact in a substantially non-evanescent manner in the merged region. The index profile of the optical waveguide varies sufficiently slowly in the longitudinal direction such that light entering the adiabatic taper region in a single eigenmode of the waveguide evolves into a single local supermode upon propagating through the adiabatic transition region. By merging the waveguides into a single wave propagation region, the wavelength selective coupling achieved upon the subsequent recording of an index of refraction grating in the waist of the coupler can be substantially increased. This device is called a grating assisted mode coupler, and is described at length in the US and PCT patent application PCT/US96/13481.

GLOSSARY

An "active" optical device is a device whose optical properties change in response to an electrical input;

A "passive" optical device is a device lacking, an electrical input which effects a change in optical properties;

An "optical fiber" herein is an elongated structure of nominally circular cross section comprised of a "core" of relatively high refractive index material surrounded by a "cladding" of lower refractive index material, adapted for transmitting an optical mode in the longitudinal direction;

A "waveguide" herein is an elongated structure comprised of an optical guiding region of relatively high refractive index transparent material (the core) surrounded by a material of lower refractive index (the cladding), the refractive indices being selected for transmitting an optical mode in the longitudinal direction. This structure includes optical fiber and planar waveguides;

An "add/drop filter" is an optical device which directs optical energy at a particular set of wavelengths from one waveguide into another waveguide;

A "grating" herein is a region wherein the refractive index varies as a function of distance in the medium. The variation typically, but not necessarily, is such that the distance between adjacent index maxima is constant;

The "bandwidth" of a grating is the wavelength separation between those two points for which the reflectivity of the grating is 50% of the peak reflectivity of the grating;

A "coupler" herein is a waveguide composed of two or more fibers placed in close proximity of one another, the proximity being such that the mode fields of the adjacent waveguides overlap to some degree;

A "waist" herein refers to that portion of an elongated waveguide with minimum cross sectional area;

An "asymmetric coupler" herein is a structure composed of two or more waveguides that are dissimilar in the region longitudinally adjacent to the coupling region;

A "transversely asymmetric" grating is an index of refraction grating in which the index variation as a function of distance from the central axis of the waveguide along a direction perpendicular to the longitudinal axis is not identical to the index variation in the opposite direction, perpendicular to the longitudinal axis. A transversely asymmetric grating possesses grating vector components at nonzero angles to the longitudinal axis or mode propagation direction of the waveguide. Orthogonal modes are not efficiently coupled by a transversely symmetric grating;

A "supermode" is the optical eigenmode of the complete, composite waveguide structure.

SUMMARY OF THE INVENTION

Optical devices and subsystems based on grating assisted mode couplers, which redirect optical energy of a particular wavelength from one waveguide to another, are described. Index of refraction gratings are impressed within the waist of an asymmetric coupler and are arranged to redirect in a bi-directional manner a selected wavelength along a particular path.

A tunable grating assisted mode coupler can be fabricated by varying the optical properties (e.g., index of refraction, length) of the coupler interaction region. Alternately, a wavelength selective optical switch can be fabricated by redirecting light of a particular wavelength through an optical switch by using a single grating, assisted mode coupler. This same technique can be used to form a wavelength selective optical amplifier and a wavelength selective optical modulator. Another type of wavelength selective optical switch is described, based on tunable, grating assisted mode couplers attached to fixed wavelength, grating assisted mode couplers. A WDM multi-wavelength transmitter subsystem, broadly tunable add/drop filters, and reconfigurable, wavelength selective routers are further disclosed. Accordingly, the present invention provides significant advantages in optical communications and sensor systems that require narrow optical bandwidth filters in which light in a particular waveguide at a particular wavelength channel is routed in a low loss manner into another waveguide.

BRIEF DESCRIPTION OF THE DRAWINGS

The present invention will be described with reference to the drawings of the following figures:

FIG. 7 shows a zero loss, wavelength selective optical switch incorporating a tunable grating assisted mode coupler in tandem with a non-tunable grating assisted mode coupler with nearly the same drop wavelength;

FIG. 9 shows a broadly tunable add/drop filter based on the optical vernier effect;

DETAILED DESCRIPTION OF THE INVENTION

Optical fibers carry signals in the form of modulated light waves from a source of data, the transmitter, to a recipient of data, the receiver. Once light enters this optical fiber, it travels in isolation unless an optical coupler is inserted at some location along the fiber. Optical couplers allow light signals to be transferred between normally independent optical waveguides.

If multiple signals at different wavelengths travel down the same fiber, it is desirable to transfer a signal at only a predetermined set of wavelengths to or from this fiber into another fiber. These devices are called wavelength selective optical couplers. A desirable attribute of such a wavelength selective optical coupler is that it remains transparent to all wavelengths other than those to be coupled. This transparency is quantified by the insertion loss, crosstalk, and bandwidth. Wavelength selective couplers of the prior art are not adequately transparent for many important applications. The grating assisted mode coupler is a fundamentally transparent device. It transfers light signals from one fiber to another at only a predefined, precise set of wavelengths. It intrinsically is a bi-directional, 4 port device that serves as both an add and drop filter. This great functionality allows an entirely new class of active optical devices and subsystems to be built around it.

Figure 1:
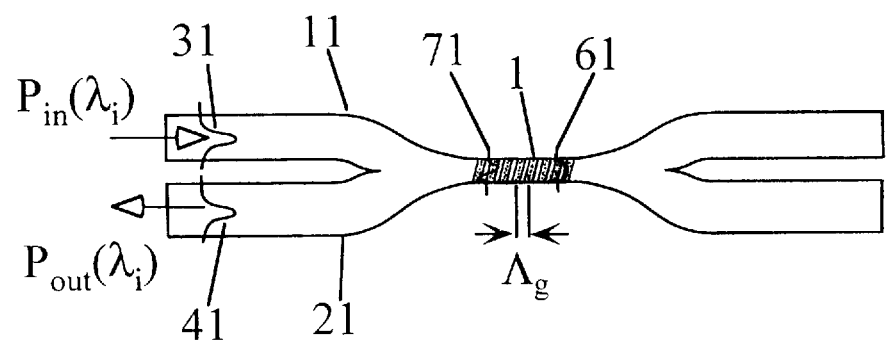
FIG. 1 shows the operation of a grating assisted mode coupler tuned to the Bragg wavelength.
Figure 2:
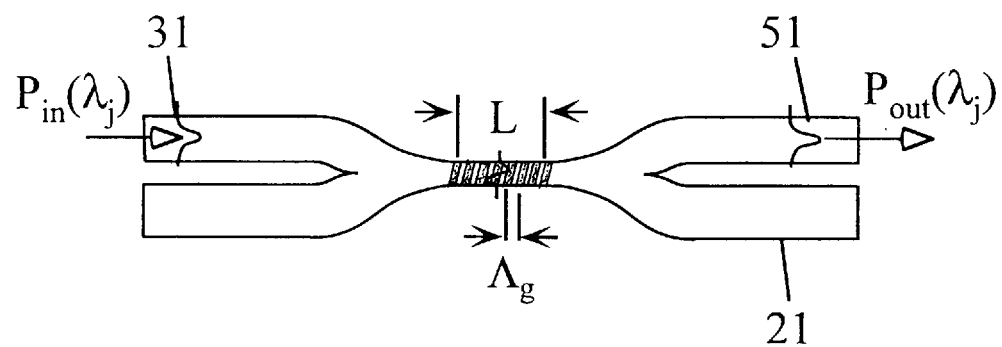
FIG. 2 shows the operation of a grating assisted mode coupler detuned from the Bragg wavelength.

The present invention provides wavelength selective optical devices and subsystems using one or more grating assisted mode coupler. In accordance with the present invention, light is coupled between two or more locally dissimilar waveguides by an index of refraction grating in the shared coupling region of the grating assisted mode coupler. The grating assisted mode coupler can be fabricated by fusing together two optical fibers, or by fabricating the structure in a planar waveguide device. FIGS. 1 and 2 illustrate the operating principle of this device. The mode coupler consists of a first waveguide 11 and a second waveguide 21 dissimilar in the vicinity of the coupling region 1 wherein an index of refraction grating has been impressed. The two waveguides are dissimilar upon entering the coupling region to provide the necessary coupler asymmetry. The input mode 31 with propagation vector $\beta'_1$ evolves into the coupler waist mode 71 with propagation vector $\beta_1$, and the backwards propagating waist mode 61 with propagation vector, $\beta_2$ evolves into the output mode 41 with propagation vector $\beta'_2$. The propagation vectors $\beta_1$ and $\beta_2$ at the waist satisfy the Bragg law for reflection from a thick index grating of period $\Lambda_g$ at a particular wavelength, say $\lambda_i$:

$$\beta_1(\lambda_i) - \beta_2(\lambda_i) = 2\pi/\Lambda_g,$$

then the optical energy at $\lambda_i$ in the first waveguide 11 is coupled into the backward propagating mode of the second waveguide 21 (FIG. 1). The spectral response and efficiency of this reflective coupling process is dictated by the coupling strength and the interaction length of the optical modes with the grating.

In FIG. 2, the wavelength of the input mode is detuned, say to $\lambda_j$, so that $\beta_1(\lambda_j) - \beta_2(\lambda_j) \neq 2\pi/\Lambda_g$, and the input mode 31 in the first waveguide travels through the coupler waist and reappears as the transmission output mode of the first waveguide 51, as seen in FIG. 2, with minimal leakage into the second waveguide 21. Therefore, only a particular wavelength $\lambda_i$ is coupled out of the first waveguide II, as determined by the grating period in the coupling region 1. The amount of wavelength detuning required to reduce the reflective coupling by 50% is given by the full-width-half-maxima (FWHM) bandwidth $\Delta\lambda$ of the grating:

$$\Delta\lambda \approx \frac{\Lambda_g \lambda_o}{L_{eff}},$$

where Leff is the effective interaction length of the optical beam and the grating, which may be less than the physical length L of the grating for large $\kappa$. The bandwidth of reflection gratings is narrower than that of transmission gratings by typically ten to fifty times because the grating period $\Lambda_g$ is much shorter for the former. The narrower frequency response in the reflection mode is desirable for dense WDM applications. Typically, the desired bandpass is approximately 0.1 nm at 1.55 $\mu$m. This dictates that the length of the reflection grating should be approximately 1 cm. A reflectivity in excess of 90% for a grating thickness L of 1 cm requires a $\kappa L$ larger than 2. $\kappa$ should then be 2 cm⁻. To achieve this coupling, strength in the fused coupler, the grating index modulation should be at least $10^{-4}$. This level of index modulation is achieved in silica planar waveguides and optical fibers by appropriate preparation of the materials and dimensions of the media.

In addition to backwards coupling of light into the adjacent waveguide, the grating typically reflects some light back into the original fiber at a different wavelength given by $2\beta_1(\lambda_2) = k_g$. To ensure that $\lambda_2$ is outside the wavelength operating range of interest, the difference between $\beta_1$ and $\beta_2$ is made sufficiently large. The difference increases as the waveguides become more strongly coupled, until the limiting case is reached, for which the waveguide cores are merged into one another. This difference is maximized for small coupler waists, in which $\beta_1$ and $\beta_2$ correspond to the $LP_{01}$ and $LP_{11}$ modes of an air-clad optical waveguide. Furthermore, an appropriate transversely asymmetric grating substantially reduces the coupling strength for back-reflection.

Figure 3:
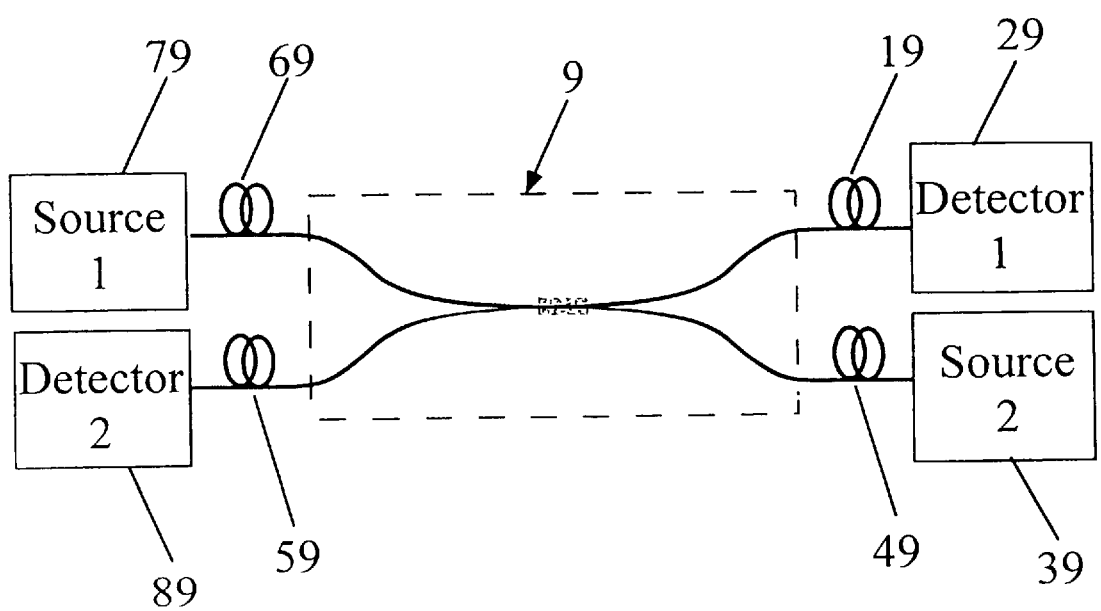
FIG. 3 shows a schematic of a grating assisted mode coupler.

The grating, assisted mode coupler 9, illustrated in FIG. 3, redirects optical energy at a particular wavelength from a source 79 to the input optical fiber 69 of the coupler. The period of the index grating formed within the coupler is chosen to redirect only that optical energy within a particular wavelength band into the drop port 59 of a second optical fiber, which travels to detector 89. All other wavelengths propagate through the coupler from the input port 69 to the throughput port 19 attached to detector 29. An additional source of light 39 at the same wavelength can be attached to the add port 49, and will be directed to the throughput port 19 by the same coupler 9. This device performs both the add and drop functions in a single component.

A new class of active fiber optic components and subsystems are made economically and practically feasible by linking other optical devices to this grating assisted mode coupler. This approach enables standard fiber optic components to be rendered wavelength selective by the simple addition of a grating assisted mode coupler. A unique property of the grating assisted mode coupler 9 is the reciprocal property of the inputs and outputs. That is, the input 69—throughput 19 and add 49—drop 59 ports behave in a complementary manner. A single grating assisted mode coupler enables complete bi-directional exchange of optical energy at a particular wavelength from a first waveguide to a second waveguide. This allows important optical devices and subsystems that have been impractical to implement using existing components to be readily achieved with this new, bi-directional device. This new class of devices includes wavelength selective optical switches, programmable wavelength routers, WDM multiwavelength sources and WDM fiber amplifiers. In the examples that follow, the grating assisted mode couplers can be fabricated by a fused fiber coupler approach or a planar waveguide approach.

EXAMPLE 1

Tunable Grating Assisted Mode Coupler

A passive, grating assisted mode coupler redirects optical energy at a particular, constant center wavelength from one fiber to another. For many applications, it is desirable to change the center wavelength of the grating assisted mode coupler dynamically. To tune a grating assisted mode coupler, the optical properties of the coupler waist can be varied e.g., either the index of refraction or physical shape. The expression for the change in Bragg, wavelength of a grating arising from a change in the optical properties (physically arising, from a change in the effective index of refraction $\delta n_{eff}$ and a change in grating period $\delta \Lambda_g$) is given by:

$$\delta \lambda_{Bragg} = 2 \Lambda_g \delta n_{eff} + 2 \delta \Lambda_g n_{eff}$$

This tunability can be achieved by physically straining or heating the coupler waist, or by subjecting the coupling region to an external electric field. Because the waist is extremely narrow (typically 15 μm or less), a strain can be readily induced by pulling on one end of the coupler waist. Strain tuning has the predominant effect of changing the grating period by an amount $\delta \Lambda_g$. A relatively small contribution to the Bragg wavelength detuning arises from index changes $\delta n_{eff}$, due to the elastooptic effect. Therefore, the detuning of the Bragg wavelength under an applied strain is approximately given by:

$$\delta \lambda_{Bragg} \approx 2 \Lambda_g \frac{\delta L}{L} n_{eff}.$$

Figure 4:
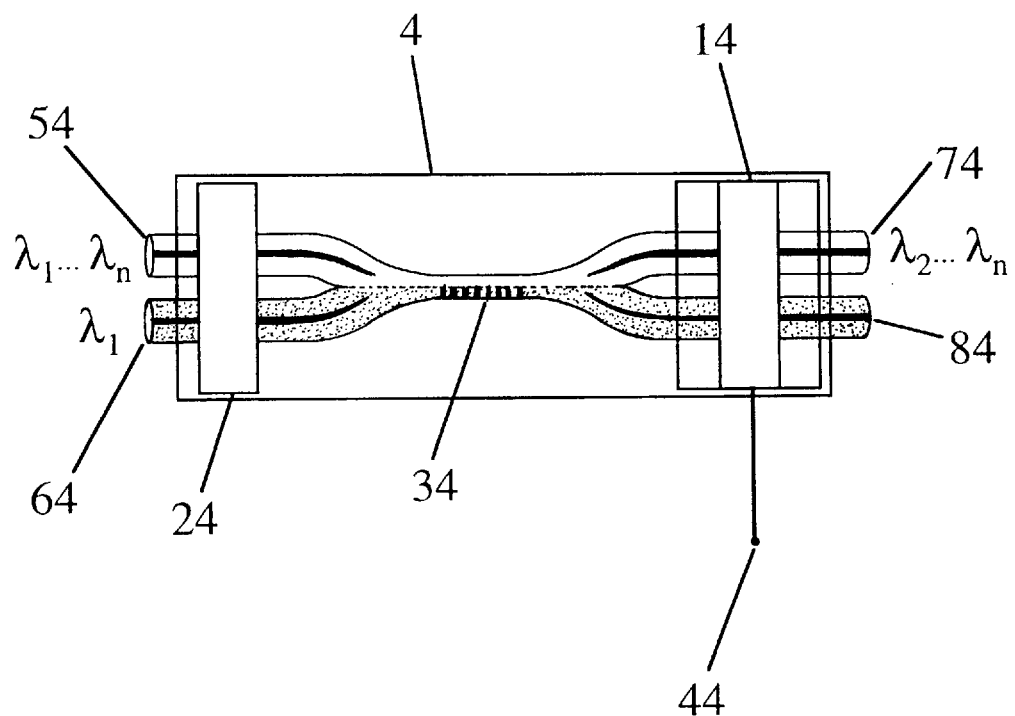
FIG. 4 shows a tunable, grating assisted mode coupler.

This strain may be induced by applying an electrical signal 44 to a movable mount 14 attached to one end of the coupler waist 34, as illustrated in FIG. 4. Strain is induced in the coupler waist 34 by a moving platform 14. The platform 14 may be actuated by a piezoelectric material which elongates or contracts in response to an electrical signal 44. The other end of the coupler is attached to a fixed mount 24.

An alternate method of tuning the grating assisted mode coupler is to vary the external temperature. Approximately 0.1 nm of tuning is achieved for every 10° C. temperature change. Alternately, if the grating assisted mode coupler displays a significant index of refraction change at the coupler waist in response to an optical or electric field, then electrical tuning of the grating assisted mode coupler center wavelength may be achieved through the electrooptic effect. Strain induced tuning is best suited for grating assisted mode couplers fabricated from fused fiber couplers, while field tuning can be implemented readily in a planar waveguide implementation of the grating assisted mode coupler.

EXAMPLE 2

Wavelength Selective Optical Switch

Optical switches can be used to dynamically route information packets from one location to another or to re-configure fiber optical communications networks. These switches are typically based on electrooptic or thermooptic modulation of a directional coupler, Y-branch waveguide or Mach-Zehnder interferometer, and can achieve a modulation bandwidth in excess of 10 Ghz. They are commercially available from United Photonics Technology and Akzo-Nobel, for example. An acoustic optical switch based on a fused asymmetric coupler has been described by Birks et al., Optics Letters Vol. 21 May 1996 (pp. 722–724). Relatively slow (10 ms) mechanical switches are also readily available. However, these switches typically do not allow only one of many wavelengths traveling along an individual fiber to be switched, as is desirable for wavelength routing in WDM networks. That is, these switches are not wavelength selective.

Figure 5:
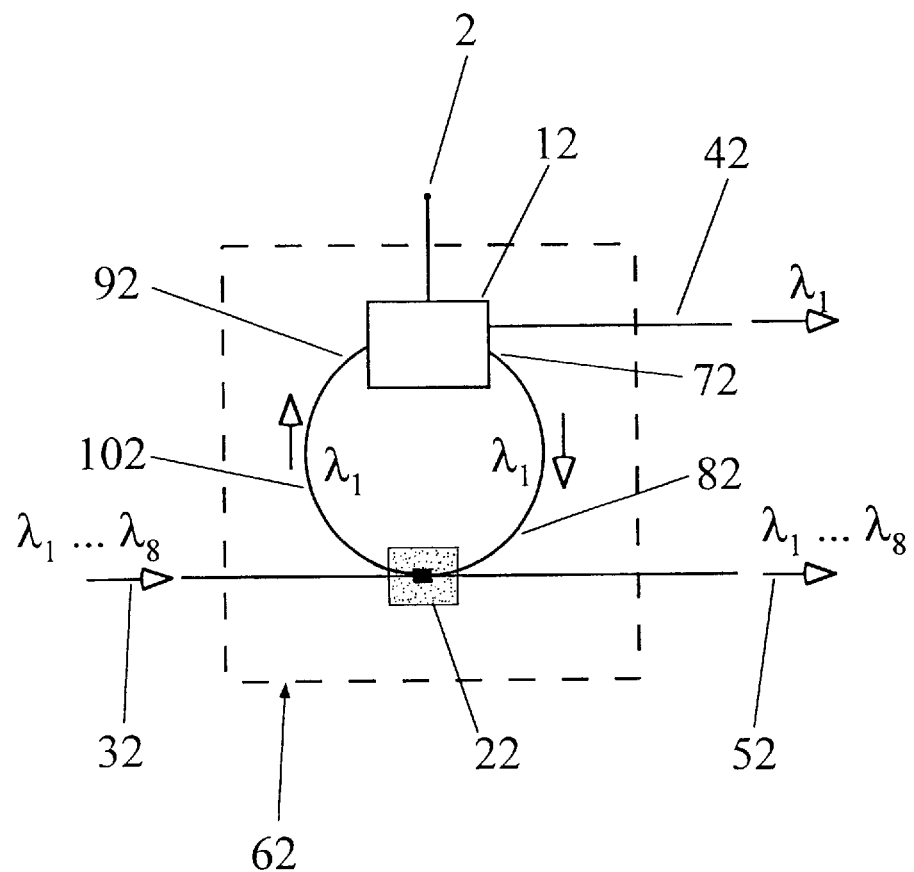
FIG. 5 shows a wavelength selective optical switch.

The grating assisted mode coupler enables a wavelength selective switch to be fabricated with extremely low loss. FIG. 5 schematically illustrates such a device. The optical switch 62 can be practically realized by combining a low loss, grating assisted mode coupler 22 with a standard, wavelength insensitive optical switch 12. The grating assisted mode coupler 22 routes the channel at $\lambda_1$, for example, from the input port 32 into the drop port 102 attached to the input 92 of a standard optical switch. The signal at $\lambda_1$ entering the switch is routed between the output fibers one 42 and two 72, without disturbing the channels at other wavelengths. The electric input signal 2 determines the state of the optical switch. All other wavelengths not equal to $\lambda_1$ travel directly from the input port 32 to the throughput port 52.

The benefits of this wavelength insensitive switch are numerous and commercially important. One obvious advantage is its inherent simplicity. Also, for a WDM optical network, multiple channels at different wavelengths need to be switched independently. If several inevitably lossy optical switches are cascaded, one for each wavelength, the losses accumulate quickly. Therefore, the low loss nature of our device allows wavelengths to be extracted and then added to an optical fiber in a transparent manner. This can isolate lossy elements from the other signals (at other wavelengths) in the fiber. For example, FIG. 5 illustrates that each wavelength travels through only a single optical switch, dramatically reducing the loss per channel.

EXAMPLE 3

Optical Amplifiers for WDM

Figure 6:
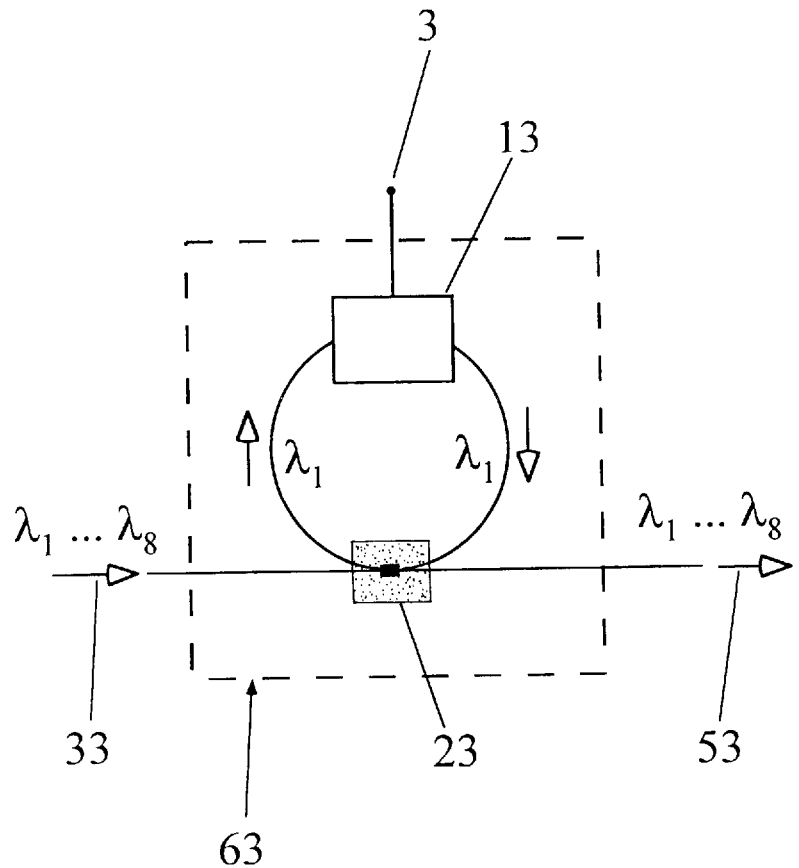
FIG. 6 shows a wavelength insensitive optical element joined to a grating assisted mode coupler.

Erbium doped fiber amplifiers (EDFAS) display a sufficiently broad gain spectrum to enable multiple WDM channels to be amplified simultaneously within a single fiber. However, in some instances it is desirable to route individual wavelength channels to different locations within the optical fiber network. As a result, each wavelength travels a different distance and requires a different level of amplification. A device to amplify only a single wavelength while remaining transparent to all other wavelengths is needed. We can fabricate such an amplifier 63 by combining a grating assisted mode coupler 23 and an EDFA 13 (FIG. 6). The Erbium doped fiber can be fusion spliced between the add and drop ports of the grating assisted mode coupler, for example. In addition, a standard WDM coupler can be inserted into the add/drop loop to couple in 980 nm light from a AlGaAs pump laser, for example. The electrical input 3 adjusts the optical gain (determined by the pump laser power) so that the signal at the wavelength $\lambda_1$ is amplified to the desired level.

EXAMPLE 4

Wavelength Selective Optical Modulator

In another example, the active element 13 of FIG. 6 is an optical modulator. A grating assisted mode coupler 23 can be used to redirect unmodulated optical energy at a particular wavelength into a standard, wavelength insensitive optical modulator 13 and return a modulated signal at this particular wavelength back onto the original fiber with extremely low loss. The is achieved by attaching the drop and add ports of an individual, grating assisted mode coupler to the input and output ports, respectively, of a standard optical modulator. This active device 63 is transparent to all other wavelengths, eliminating the undesirable loss associated with modulating multiple wavelength channels. The optical modulators are commercially available from United Photonics Technology, for example.

EXAMPLE 5

Wavelength Selective Switch Based on a Tunable, Grating Assisted Mode Coupler

An all-fiber, wavelength selective switch 77 can be alternately formed by combining a tunable grating assisted mode coupler 27 with a fixed wavelength grating assisted mode coupler 7. This device is expected to display extremely low loss and a fast switching time. Such a device is illustrated in FIG. 7. Tuning is achieved by tensioning the coupler waist. For example, an applied strain of only 0.1% is sufficient to de-tune the Bragg peak 107 1 nm from $\lambda_1+\delta$ to $\lambda_1$. In this state, the Bragg wavelengths of the reflectivity peaks 87 and 97 of the two couplers coincide, so that the second grating assisted mode coupler switches light from the switch input 57 at wavelength $\lambda_1$ into the switch output 47. Because of the symmetrical nature of this device, the switch is bi-directional, and its all-fiber construction leads to an extremely low loss device. The time response to apply tension to the waist is essentially the time for the piezoelectric actuator to expand or contract and launch a longitudinal acoustic wave down the fiber waist. This time is approximately 10 μs. As a result of the small diameter of the coupler waist, extremely small forces are required to suitably strain the waist. Suitable piezoelectric actuators and controllers are available from Burleigh, Inc., and Polytec P.I.

EXAMPLE 6

WDM Multiwavelength Transmitter

It is well known in the art that mode locked lasers emit light at a series of discrete wavelengths, and these discrete wavelengths can form the basis of a WDM light source [D. U. Noske, M. J. Guy, K. Rottwitt, R. Kashyap, J. R. Taylor, *Optics Comm.* 108, 297–301 (1994), D. A. Pattison, P. N. Kean, J. W. D. Gray, I. Bennion, N. J. Doran, Photosensitivity and quadratic nonlinearity in glass waveguides (Opt. Soc. Amer., Portland, Oregon, 1995), vol. 22, pp. 140–143, J. B. Schlager, S. Kawanishi, M. Saruwatari, *Electronics Letters* 27, 2072–2073 (1991), H. Takara, S. Kawanishi, M. Saruwatari, J. B. Schlager, *Electron. Lett.* 28, 2274–2275 (1992)]. However, the wavelength components of the mode locked pulse train must be externally modulated independently. This can be achieved with low loss by using multiple narrow bandwidth, grating assisted mode couplers.

The frequency spacing of a mode locked laser is equal to the inverse of the round trip cavity time, τ=2nL/c. Since the gain spectrum of semiconductor lasers is relatively broad (i.e., 100 nm), a large number of discrete, equally spaced optical frequencies can be generated by mode locking. A standard channel spacing for WDM is 100 GHz. This frequency spacicng corresponds to a mode locked laser cavity length of 500 μm to 1.5 mm. More typical cavity lengths in semiconductor lasers are 100 μm, producing a channel spacing of 20 GHz. Therefore, an external cavity semiconductor laser may be the preferred mode locked laser source.

Figure 8:
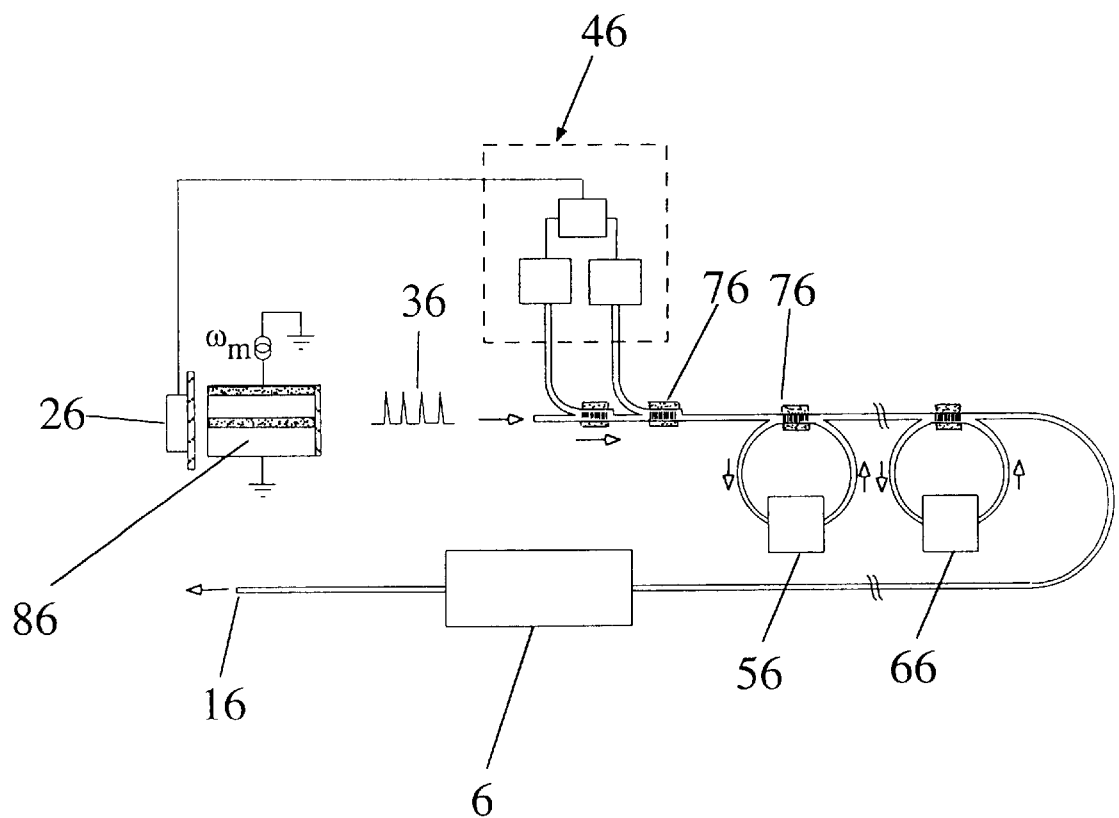
FIG. 8 shows an eight-channel, multi-wavelength WDM source.

The EDFA gain window is approximately 30 nm around 1550 nm. This corresponds to approximately 37 independent wavelength channels with a 0.8 nm channel spacing that can be readily accessed and independently modulated. Presently, an optical device to separate the individual wavelengths in a low loss manner does not exist. However, the grating assisted mode couplers described herein provide a novel method of demultiplexing, this optical signal into its wavelength constituents, enabling each wavelength to be externally modulated (and/or amplified), before being multiplexed back onto the output fiber. FIG. 8 illustrates the WDM transmitter subsystem according to this invention. A train of mode locked pulses 36 is generated by a single mode locked laser 26 (e.g., a semiconductor laser) and coupled into an optical fiber or planar waveguide. To stabilize the wavelength of the laser, a wavelength locking system 46 is required, consisting of one or more grating assisted mode couplers used to route the signals at one or more particular wavelengths into one or more detectors. Two detectors are commonly used. The difference of the electrical signals from these detectors is then used as an error signal, which is fed back to a piezoelectric mounted mirror 26 or heater (to change the cavity length and/or optical index of refraction), which stabilizes the laser to a particular set of discrete wavelengths.

The multi-wavelength laser output next travels through a series of grating assisted mode couplers 76 that route each wavelength channel through an independent optical modulator 56 before returning each wavelength channel to the main waveguide 16 by the original grating assisted mode couplers 76. To increase the strength of the signal, all wavelengths may be passed through an optical amplifier 6. Alternately, an optical amplifier may be placed in series with each optical modulator 56, 66. This individually amplifies each wavelength channel. This implementation of a WDM multi-wavelength transmitter has the inherent advantage of producing a series of precisely spaced wavelengths that are automatically and precisely locked to an external reference by monitoring only one of the output wavelengths. The low loss of the grating assisted mode couplers enable them to perform several tasks: separating the various wavelengths for modulation, recombining them in the output fiber, and stabilizing the wavelengths of the laser emission. This laser transmitter realization is also well suiited to a planar waveguide fabrication approach because of the relative ease and simplicity of integrating the various components on a substrate.

EXAMPLE 7

Broadly Tunable Add/Drop

A broadly tunable add/drop device 78 can be realized by using a vernier type effect [Z. M. Chuang et al., IEEE Photonics Technology Letters, Vol. 5, October 1993 (pp. 1219–1221, Z. M. Chuang et al., IEEE Journal of Quantum Electronics, Vol. 29, April 1993 (pp. 1071–1080)] in a grating assisted mode coupler, as illustrated in FIG. 9. This is achieved by joining the output of one grating assisted mode coupler to the input of another.

The first grating assisted mode coupler 8 has multiple gratings recorded in its waist, each at a slightly different wavelength, preferably equal to the standard WDM wavelength channels. This mode coupler is static and attached to a tunable grating assisted mode coupler 28. The tunable grating assisted mode coupler also has multiple gratings recorded in its waist, each at a slightly different wavelength. This set of gratings are at slightly different wavelengths with a slightly different wavelength spacing between adjacent channels than the set of wavelengths of the static grating assisted mode coupler. This second mode coupler is then tuned by an external signal 18 to bring one of its Bragg wavelengths in coincidence with one of the Bragg wavelengths of the first coupler. By further tuning, each wavelength channel in the sequence become matched one at a time to the static grating assisted mode coupler. The final wavelength channel in the sequence may be in excess of 10 nm away from the first wavelength channel, a much larger wavelength departure than that achieved by direct tuning (about 1 nm). The vernier type effect has the advantage of increasing the practical wavelength tuning range.

EXAMPLE 8

Reconfigurable, Wavelength Selective Router #1

Figure 10:
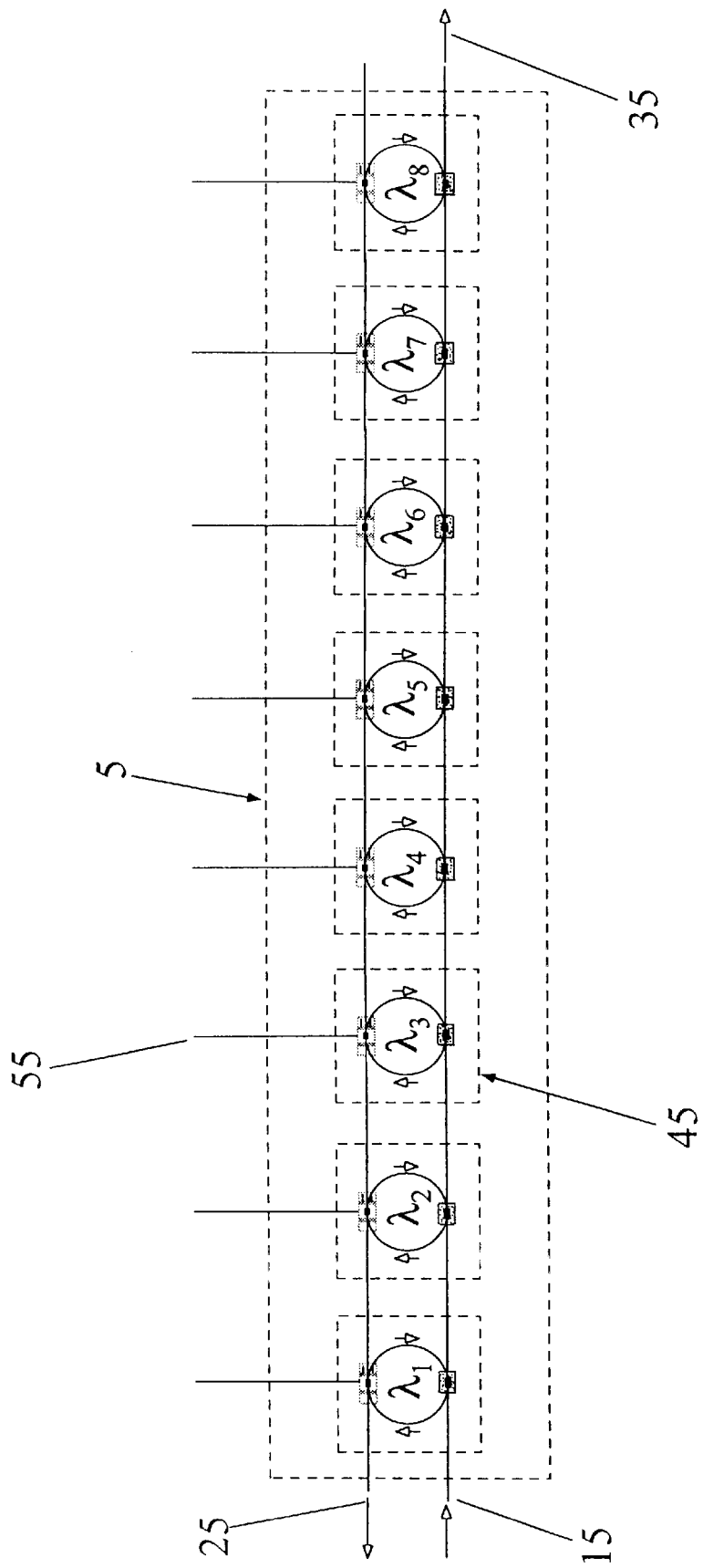
FIG. 10 shows an eight channel, programmable WDM router.

It is desired to have optical subsystems which dynamically route any combination of wavelength channels from one fiber to another, the particular combination of channels to be routed at each instant being determined by an input signal. FIG. 10 illustrates an eight channel programmable router 5 constructed from eight wavelength selective optical switches 45. The wavelength selective optical switches 45 correspond to those devices described in EXAMPLE 4. As described in this section, each wavelength selective optical switch itself consists of a static grating assisted mode coupler in tandem with a dynamic grating assisted mode coupler. Since individual grating assisted mode couplers exhibit extremely low loss, the complete device should exhibit a correspondingly low loss. Light at each wavelength channel can be independently and dynamically routed from the input fiber 15 to either of two output fibers 35, 25 by adjusting the electrical inputs 55 to each optical switch.

EXAMPLE 9

Reconfigurable, Wavelength Selective Router #2

An alternate n channel programmable router can be constructed from n wavelength selective optical switches, as described in EXAMPLE 2, and n grating assisted mode couplers. Each wavelength selective optical switch itself consists of a static grating assisted mode coupler in tandem with a standard wavelength insensitive optical switch. The drop outputs of the optical switches are each connected to a grating assisted mode coupler at the same wavelength, to direct each individual drop channel of a particular wavelength back onto the multiple wavelength output fiber.

Conclusions

It should now be appreciated that the present invention and all of its exemplifications provide a wavelength selective optical coupler displaying a variety of advantages. The wavelength selective optical fiber devices disclosed herein have a variety of applications. In one application, a coupler is used to add or drop optical signals for communication via a common transmission path. In another application, a device is used to achieve narrowband optical switching. In another application, a tunable, grating assisted mode coupler is described. In another application, a number of couplers are used to produce a multi-wavelength laser source. In another application, the several devices are combined to form a programmable wavelength selective router. In another application, a coupler is used to produce a wavelength selective optical amplifier. In another application, a coupler is used to produce a wavelength selective optical modulator. A person understanding this invention may now conceive of alternative structures and embodiments or variations of the above. All of those which fall within the scope of the claims appended hereto are considered to be part of the present invention.

We claim:

1. A wavelength selective device for control of optical signal energy comprising:
   at least one grating assisted mode coupler having a first pair of terminals and a second pair of terminals, and including a wavelength selective reflection grating in a non-evanescent coupling region in communication with all the terminals for selectively directing only the selected wavelength between terminals of the first pair and terminals of the second pair while directing other wavelengths between terminals of the two pairs; and
   an optical waveguide providing a multi-wavelength signal;
   a first terminal of the first pair of terminals of the grating assisted mode coupler being coupled to the optical waveguide, the grating reflecting the selected wavelength to the second terminal of the first pair, and
   a signal processor inserted between the second terminal of the first pair and a first terminal of the second pair for delivering a modified signal at the selected wavelength to the coupler.

2. A device as set forth in claim 1 wherein the coupler is bi-directional, and wherein the multi-wavelength signal, but for the selected wavelength, is passed through the coupler to the second terminal of the second pair and the modified signal is reflected from the coupler to be combined with the passed through multi-wavelength signal.

3. A device as set forth in claim 1 wherein the signal processor includes an optical amplifier.

4. A device as set forth in claim 1 wherein the signal processor includes an optical modulator.

5. A device as set forth in claim 1 wherein the signal processor includes an optical switch.

6. A device as set forth in claim 1 wherein the signal processor includes a bi-directional transmitter/receiver.

7. A device as set forth in claim 1, wherein the at least one coupler and processor comprises a number of couplers and signal processors, disposed serially along said optical waveguide each processing a different set of wavelengths.

8. A device in accordance with claim 7 wherein said signal processors include modulators.

9. A device in accordance with claim 7 wherein said signal processors include optical amplifiers.

10. A device in accordance with claim 7 wherein said signal processors include optical switches.

11. A device in accordance with claim 7 wherein said signal processors include bi-directional transmitters/receivers.

12. A bi-directional wavelength selective device for redirecting optical wave energy comprising:
    at least one grating assisted mode coupler having a first pair of terminals and a second pair of terminals, and including a wavelength selective reflection grating in an asymmetric coupling region having dissimilar waveguides and in communication with all the terminals;
    an input optical waveguide coupled to one of the first pair of terminals to apply a multi-wavelength signal thereto;
    a first output optical waveguide coupled to the other of the first pair of terminals to receive the selected wavelength, and
    a second output optical waveguide coupled to one of the second pair of terminals to receive the remaining wavelength signals; and
    a second input optical waveguide coupled to the other of the second pair of terminals to apply a multi-wavelength signal thereto.

13. A bi-directional wavelength selective device for redirecting optical wave energy comprising:
    at least one grating assisted mode coupler having a first pair of terminals and a second pair of terminals, and including a wavelength selective reflection grating in an asymmetric coupling region in communication with all the terminals;
    an input optical waveguide coupled to one of the first pair of terminals to apply a multi-wavelength signal thereto;
    a first output optical waveguide coupled to the other of the first pair of terminals to receive the selected wavelength, and
    a second output optical waveguide coupled to one of the second pair of terminals to receive the remaining wavelength signals; and a second input optical waveguide coupled to the other of the second pair of terminals to apply a multi-wavelength signal thereto, wherein the grating assisted mode coupler has a waist region and comprises a transversely asymmetric index of refraction grating disposed in the waist region of the coupler.

14. A device in accordance with claim 13 wherein said grating assisted mode coupler further comprises an adjustable mechanical support attached in the vicinity of the coupler waist which is actuable in response to an input tuning signal.

15. A wavelength selective optical switch that routes light energy at a particular wavelength comprising:

a first optical waveguide;

a second optical waveguide;

a grating assisted mode coupler, said coupler having an input, throughput, drop, and add port, the input and throughput ports being coupled to the first optical waveguide, and including one or more transversely asymmetric gratings in the coupling section, the periods of said gratings being chosen to redirect the channel of a selected wavelength from the first optical waveguide into the drop port; and an optical switching device having a switch input and a first and second switch output, the switch input being coupled to the drop port, the first switch output being coupled to the add port of said grating assisted mode coupler and the second switch output being coupled to the second optical waveguide.

16. A wavelength selective optical modulator which modulates the light signal at a particular wavelength comprising:

an optical waveguide;

a grating assisted mode coupler, said coupler having an input, throughput, drop, and add port, the input and throughput ports being coupled to said optical waveguide, and including one or more transversely asymmetric gratings, the periods of said gratings being chosen to redirect the channel of a selected wavelength from the waveguide into the drop port;

a light modulating device having a modulator input and output port, the drop port of said grating assisted mode coupler being coupled to the modulator input port and the add port being coupled to the modulator output port.

17. A device in accordance with claim 16 wherein said light modulating device modulates the optical phase of light energy passing through it.

18. A device in accordance with claim 16 wherein said light modulating device modulates the optical amplitude of light energy passing through it.

19. A wavelength tunable optical device for adding a channel at one or more variable wavelengths to an optical waveguide carrying a number of wavelengths comprising:

a first optical waveguide;

a second optical waveguide; and a grating assisted mode coupler having input and throughput ports coupled to the first optical waveguide and an add port coupled to the second optical waveguide, said grating assisted mode coupler providing non-evanescent coupling and including one or more gratings, the periods of said gratings being chosen to redirect the added channels of the wavelengths from the second optical waveguide into the first optical waveguide, said grating assisted mode coupler having a waist and including a means of imparting a longitudinal strain only across the one or more gratings within the waist in response to an external tuning signal.

20. A wavelength tunable optical device for dropping a channel at one or more variable wavelengths to an optical waveguide transmitting a number of wavelengths comprising:

a first optical waveguide;

a second optical waveguide; and a grating assisted mode coupler having an input and throughput port coupled to the first optical waveguide and a drop port coupled to the second optical waveguide, said grating assisted mode coupler providing non-evanescent coupling and including one or more gratings, the periods of said gratings being chosen to redirect the dropped channels of the wavelengths from the second optical waveguide into the first optical waveguide, said grating assisted mode coupler including signal responsive means for imparting a longitudinal strain across only the one or more gratings within the grating assisted mode coupler.

21. A bi-directional, wavelength selective interconnect for optical communications comprising:

a first tunable, grating assisted asymmetric mode coupler with dissimilar waveguides in the coupling region and having a first input, first throughput, first drop and first add port, and a first drop wavelength; and a second grating assisted asymmetric mode coupler with dissimilar waveguides in the coupling region and having a second input, second throughput, second drop and second add port, and a second drop wavelength, with the first drop port coupled to the second input port, and the second throughput port coupled to the first add port.

22. A device as set forth in claim 21, wherein the interconnect provides optical switching between the second drop port and the first throughput port and wherein the device includes means for tuning said first and second drop wavelengths into and out of equality to effect switching.

23. A device as set forth in claim 21, wherein the first and second drop wavelengths are substantially identical.

24. A programmable, wavelength selective router which routes some combination of wavelength channels from a waveguide, comprising:

an optical waveguide;

a plurality of transversely asymmetric grating assisted mode couplers, each having an input, throughput, add and drop port, such that the input and throughput ports of said plurality of grating assisted mode couplers are disposed in a serial fashion along said optical waveguide;

a plurality of optical switches, each having an input and a first and a second output, said drop ports of each grating assisted mode coupler being coupled to the input of a different optical switch, the add ports of each being coupled to the first output of a different optical switch.

25. A programmable, wavelength selective router which directs some combination of wavelength channels from one optical waveguide to another, comprising:

a first optical waveguide;

a second optical waveguide;

a first plurality of transversely asymmetric grating assisted mode couplers, each having an input, throughput, add and drop port, the input and throughput ports of said first plurality of grating assisted mode couplers being disposed in serial fashion along said first optical waveguide;

a plurality of optical switches, each having an input and a first and second switch output, the drop ports of the individual grating assisted mode couplers being coupled to the switch inputs of different optical switches, the add ports of the individual grating assisted mode couplers each being coupled to different first switch outputs;

a second plurality of transversely asymmetric grating assisted mode couplers, each having an input, throughput and add port, the input and throughput ports of said second plurality of grating assisted mode couplers disposed in serial fashion along said second optical waveguide, said second switch output being individually coupled to different ones of the grating assisted mode couplers.

26. A programmable, wavelength selective router comprising:

a plurality of passive transversely asymmetric grating assisted mode couplers, each having an add and drop port, and a plurality of tunable transversely asymmetric grating assisted mode couplers, each having an input and throughput port, the individual drop ports of passive transversely asymmetric grating assisted mode couplers being coupled to the input ports of different ones of the tunable transversely asymmetric grating assisted mode couplers, the individual add ports of the passive transversely asymmetric grating assisted mode couplers being coupled to different ones of the throughput ports of said tunable transversely asymmetric grating assisted mode couplers.

27. A broadly tunable add/drop filter comprising:

a tunable grating assisted mode coupler, having an input, throughput, drop and add port and including a first set of drop wavelengths spaced equally by a first wavelength increment, and a passive grating assisted asymmetric mode coupler, having an input, throughput, drop and add port and including a second set of drop wavelengths spaced equally by a second wavelength increment different than said first wavelength increment, the input port of said tunable grating assisted mode coupler being coupled to the drop port of said passive grating assisted asymmetric mode coupler, the throughput port of the tunable grating assisted mode coupler being coupled to the add port of the passive grating assisted asymmetric mode coupler, whereby tuning said tunable, grating assisted mode coupler enables one of the first set of drop wavelengths to match any one of the second set of drop wavelengths of said passive grating assisted asymmetric mode coupler.

28. A source of a multi-wavelength optical signal for communicating information comprising:

an optical waveguide, a source of multi-wavelength light including a mode-locked laser operating at a multiplicity of wavelengths and attached to said optical waveguide, a number of asymmetric grating assisted mode couplers, each having an input, throughput, add and drop port, the input and throughput ports being inserted in a serial fashion along said optical waveguide, an equal number of optical modulators, each having an input and output port, the drop ports of individual couplers being coupled to different input ports of said modulators and the add ports of individual couplers being coupled to different output ports of said modulators.

29. A source of multi-wavelength optical signal in accordance with claim 28 including in addition a photodetector and an additional grating assisted mode coupler having an input, throughput, add and drop port, the input and throughput ports being inserted at a preselected location along said optical waveguide and the drop port being coupled to the photodetector to generate an electrical signal, said electrical signal from said photodetector serving as an indicator of the light power at a particular wavelength of the source, such that said indicator is used to wavelength-lock said multi-wavelength light.

30. A wavelength selective device for control of optical signal energy comprising:

at least one grating assisted asymmetric mode coupler having a first pair of terminals and a second pair of terminals, and including a transversely asymmetric wavelength selective reflection grating in a coupling region in communication with all the terminals for selectively directing only the selected wavelength between first and second terminals of the first pair and first and second terminals of the second pair, respectively, while directing other wavelengths between the first terminals of the first and second pairs and the second terminals of the first and second pairs, respectively;

an optical waveguide providing a multi-wavelength signal to said coupler;

a first terminal of the first pair of terminals of the grating assisted asymmetric mode coupler being coupled to the optical waveguide, the grating reflecting the selected wavelength to the second terminal of the first pair; and a signal processor inserted between a second terminal of the first pair and a first terminal of the second pair for delivering a modified signal at the selected wavelength to the coupler.

31. A wavelength selective device for control of optical signal energy comprising:

at least one grating assisted mode coupler having a first pair of terminals and a second pair of terminals, and including a transversely asymmetric wavelength selective reflection grating characterized by being substantially insensitive to longitudinal placement in a coupling region in communication with all the terminals for selectively directing only the selected wavelength at a terminal of either of the pairs between terminals of the first pair and terminals of the second pair while directing other wavelengths at a terminal of one of the two pairs to the other of the two pairs;

an optical waveguide providing a multi-wavelength signal;

a first terminal of the first pair of terminals of the grating assisted mode coupler being coupled to the optical waveguide, the grating reflecting the selected wavelength to the second terminal of the first pair; and a signal processor inserted between a second terminal of the first pair and a second terminal of the second pair for delivering a modified signal at the selected wavelength to the coupler.

* * * * *